(12) United States Patent
Kleinert

(10) Patent No.: US 11,905,339 B2
(45) Date of Patent: Feb. 20, 2024

(54) OXIDATIVE DEGRADATION OF CELLULOSE ETHERS

(71) Applicant: SE TYLOSE GMBH & CO. KG, Wiesbaden (DE)

(72) Inventor: Mike Kleinert, Mainz (DE)

(73) Assignee: SE TYLOSE GMBH & CO. KG, Wiesbaden (DE)

( * ) Notice: Subject to any disclaimer, the term of this patent is extended or adjusted under 35 U.S.C. 154(b) by 44 days.

(21) Appl. No.: 16/956,945

(22) PCT Filed: Dec. 20, 2018

(86) PCT No.: PCT/EP2018/086156
§ 371 (c)(1),
(2) Date: Jun. 22, 2020

(87) PCT Pub. No.: WO2019/122104
PCT Pub. Date: Jun. 27, 2019

(65) Prior Publication Data
US 2021/0002386 A1 Jan. 7, 2021
US 2021/0355242 A9 Nov. 18, 2021

(30) Foreign Application Priority Data

Dec. 22, 2017 (DE) .................. 10 2017 223 690.6

(51) Int. Cl.
*C08B 11/20* (2006.01)
*C08B 11/08* (2006.01)

(52) U.S. Cl.
CPC ............. *C08B 11/20* (2013.01); *C08B 11/08* (2013.01)

(58) Field of Classification Search
CPC ............................... C08B 11/20; C08B 11/06
See application file for complete search history.

(56) References Cited

U.S. PATENT DOCUMENTS

| 4,316,982 | A | 2/1982 | Holst et al. |
| 6,586,588 | B1 | 7/2003 | Cimecioglu |
| 6,939,961 | B1 | 9/2005 | Schlesiger |
| 2002/0168407 | A1* | 11/2002 | Koch ...................... C08B 11/20 424/480 |
| 2004/0242862 | A1* | 12/2004 | Hammes ................. C08B 11/20 536/120 |

FOREIGN PATENT DOCUMENTS

| DE | 1543116 | | 7/1969 |
| DE | 19854770 | A1 | 5/2000 |
| DE | 19941893 | A1 | 3/2001 |
| EP | 0018547 | | 11/1980 |
| WO | 00/32636 | A1 | 6/2000 |
| WO | 03/018637 | A1 | 3/2003 |
| WO | WO 2003018637 | A1 * | 3/2003 |
| WO | 2004/011501 | A1 | 2/2004 |
| WO | 2009/061815 | | 5/2009 |
| WO | 2010043307 | A1 | 4/2010 |
| WO | WO-2016069343 | A1 * | 5/2016 ............. C08B 13/00 |

OTHER PUBLICATIONS

International Search Report dated Mar. 25, 2019 for International Application No. PCT/EP2018/086156.
Sarode et al., Low-Viscosity Hydroxypropylcellulose (HPC) Grades SL and SSL: Versatile Pharmaceutical Polymers for Dissolution Enhancement, Controlled Release, and Pharmaceutical Processing, AAPS PharmSciTech, vol. 14, No. 1, Mar. 2013, pp. 151-159.
German Search Report dated Aug. 7, 2018 for Application No. DE 10 2017 223 690.6.
Huang, et al., "Application of hydroxypropyl cellulose in the development of new drug formulations," Northwest Pharmaceutical Journal, 1989, 4(4).
Goodwin et al.: "Ultrasonic degradation for molecular weight reduction of pharmaceutical cellulose ethers", Carbohydrate Polymers, vol. 83, No. 2, 2011, pp. 843-851. Abstract.
Thielking et al.: "Cellulose Ethers", Ullmanns' Encyclopedia of Industrial Chemistry, 2006, 18 pages.
Lewin: "Oxidation and aging of cellulose", Macromol. Symp., vol. 118, 1997, pp. 715-724.

* cited by examiner

*Primary Examiner* — Shaojia A Jiang
*Assistant Examiner* — Everett White
(74) *Attorney, Agent, or Firm* — Meunier Carlin & Curfman LLC

(57) ABSTRACT

The invention relates to a method for producing a low-viscosity cellulose ether product, and to the use thereof.

19 Claims, No Drawings

OXIDATIVE DEGRADATION OF CELLULOSE ETHERS

CROSS REFERENCE TO RELATED APPLICATIONS

This application is a national stage application, filed under 35 U.S.C. § 371, of International Patent Application Number PCT/EP2018/086156, filed on Dec. 20, 2018, which claims priority to German Patent Application No. 10 2017 223 690.6, filed on Dec. 22, 2017, both of which are incorporated by reference herein.

DESCRIPTION

The invention relates to a method for producing a low-viscosity cellulose ether product, to the low-viscosity cellulose ether product obtainable by the method, and to the use thereof.

Cellulose ether typically has a high viscosity because high-polymer cellulose is used as the starting material for the production thereof. The viscosity of the cellulose ether starting material can be reduced by depolymerisation. In addition to the acid-catalysed hydrolytic cleavage of the acetal bond, the processes used to degrade cellulose ethers also include, inter alia, oxidative and acid-oxidative degradation, degradation using high-energy radiation or microorganisms/enzymes, and degradation using ultrasound (Thielking et al., *Cellulose Ethers*, Ullmann's Encyclopaedia of Industrial Chemistry, 2006). In industry, mainly acidic and oxidative processes are used in cellulose ether production. A basic distinction is made between dry and wet processes.

It is known that it is not primarily the degree of degradation ($\eta_0/\eta_{new}$) that is technically challenging, but rather the final achievable viscosity, e.g. in aqueous solution. It is much easier to reduce the viscosity of $\eta_{educt}$=60,000 mPas to $\eta_{product}$=30 mPas than to reduce the viscosity of $\eta_{educt}$=300 mPas to $\eta_{product}$=6 mPas, although the magnitude of this reduction is 60,000/30=2,000 in the first case and only 300/6=50 in the second case.

It is known that cellulose ethers with reduced viscosity due to depolymerisation often contain degradation products which can disadvantageously lead to discolouration in aqueous solution. A corresponding yellow discolouration can be quantified, e.g. using standardised methods such as ASTM E313, ASTM D5386-16, and ASTM D1925.

Typically, either a bleaching step or a subsequent washout step, in which impurities are removed in order to minimise the yellowing, must follow depolymerisation. Generally problematic with the usual aqueous washout processes to reduce yellowing following degradation, however, is the significantly increased water solubility of the degraded, reduced-viscosity cellulose ether fragments. The result is high losses in yield during purification. Aqueous washout is particularly suitable for products that can be flocculated with hot water, that is, in particular non-ionic types that are relevant on an industrial scale, such as hydroxypropyl cellulose (HPC), methyl hydroxyethyl cellulose (MHEC) and methyl hydroxypropyl cellulose (MHPC).

The oxidative degradation of cellulose ethers generally leads to unselective chain cleavages resulting in a high number of oxidised by-products and cleavage products in the crude product, that as impurities reduce the purity of the product. The oxidation and formation of chromophores are known for cellulose and also macroscopically lead to a yellow discolouration of the dry product and the aqueous solutions thereof. The mechanisms can be transferred analogously from cellulose to cellulose derivatives such as cellulose ether (Lewin, *Macromol. Symp.* 1997, 118, 715-724).

The acidic degradation from higher-viscosity to low-viscosity cellulose ethers takes place at elevated temperature (>60° C.) and, in the case of dry educts, can be carried out with gaseous mineral acids such as HCl. The degradation of dry or moist educts can alternatively also be accomplished with aqueous solutions of mineral or strong organic acids. However, dosage and, in particular, uniform distribution are difficult to achieve, since most cellulose ethers are both very water-soluble and often hygroscopic. This can lead to clumping, with the result that heterogeneous products are obtained, some of which have significant discolouration. In addition, excess acid must then be neutralised with base. The addition of mineral acids and subsequent neutralisation with base disadvantageously increases the salt content of the product, which can be disadvantageous in particular in applications in the pharmaceutical sector. In addition, a bleaching step is usually necessary afterwards in order to achieve the desired high brilliance and minimal yellow discolouration of the degraded product.

EP 0 018 547 describes a method for reducing the viscosity of water-soluble, non-ionic cellulose ethers (methyl hydroxyethyl, carboxymethyl and hydroxy ethyl-cellulose) having a dry content of 20 to 95% by reacting with an ozone/oxygen or ozone/air mixture at a temperature of about 0-60° C. The yellow discolouration of the products is not perceived as a problem.

WO 2003/018637 describes a method for depolymerising dried and ground cellulose ethers using acid-oxidative degradation by means of mineral acid and oxidising agents. The acid is then neutralised by adding a base. The acid-oxidative drying process supposedly does not require any aqueous washout of potentially generated cleavage products, which means that the known high washout losses of very low-viscosity degradation products can be avoided in the usual hot water washout. The whiteness of the depolymerised cellulose ethers is between 71 and 83. The production of end products having a very low viscosity (<30 mPas) specifically requires relatively harsh reaction conditions, i.e. a high acid concentration and high temperature. The end products have correspondingly low degrees of whiteness. In addition, there is a high salt load during neutralisation, which is undesirable particularly in pharmaceutical applications.

WO 2009/061815 describes a multistage acid-oxidative drying method for producing very low-viscosity cellulose ethers without discolouration. In the method, cellulose ether is depolymerised in the dry state at an elevated temperature with a first oxidising agent and an acid. This is followed by neutralisation. Due to considerable discolouration, a second oxidising agent is added to remove the colour. Low-viscosity MHPC types with viscosities in the range of 1.2-50 mPas were obtained in 2% aqueous solution at 20° C.

WO 00/32636 discloses a method for the oxidative degradation of water-moist cellulose ethers, such as MHEC and MHPC, by gradually adding hydrogen peroxide at temperatures between 65 and 125° C. The still moist raw product is neutralised and then dried. No information about discolouration is provided.

The object of the present invention is to provide low-viscosity, preferably very low-viscosity, cellulose ethers with minimal yellowing.

Surprisingly, it was found that the above-mentioned problem can be solved by combining moist oxidative depolymerisation and subsequent neutralisation in the dry product.

The subject matter of the present application is therefore a method for producing a low-viscosity cellulose ether product, comprising the steps:
(i) providing at least one water-moist cellulose ether starting material;
(ii) adding at least one oxidising agent to the cellulose ether starting material from step (i) under shear;
(iii) treating the mixture obtained in step (ii) at temperatures in the range of 20-100° C., preferably 70-100° C.;
(iv) drying the mixture obtained in step (iii); and,
(v) adding at least one alkaline salt to the mixture obtained in step (iv) to obtain the low-viscosity cellulose ether product, wherein the cellulose ether starting material has a higher solution viscosity than the cellulose ether product.

The cellulose ether starting material is preferably selected from hydroxypropyl cellulose (HPC), methyl hydroxypropyl cellulose (MHPC) and methyl hydroxyethyl cellulose (MHEC), more preferably hydroxypropyl cellulose (HPC).

Hydroxypropyl cellulose preferably has a molar degree of substitution MS(PO) of 3.5 to 4.5, more preferably 3.8 to 4.2, and/or an HPO content of 70 to 78%, more preferably 73 to 76%.

Methyl hydroxyethyl cellulose (MHEC) preferably has a molar degree of substitution MS(EO) of 0.001 to 0.400, more preferably 0.15 to 0.32, and/or a mean degree of substitution DS(Me) of 1.0 to 2.0, more preferably 1.5 to 1.9.

Methyl hydroxypropyl cellulose (MHPC) preferably has a molar degree of substitution MS(PO) of 0.1 to 1.0, more preferably 0.25 to 0.6, and/or a mean degree of substitution DS(Me) of 1.0 to 2.0, more preferably 1.5 to 1.9.

The above-mentioned cellulose ether starting materials are used in particular in pharmaceutical technology. In this field, not only is the viscosity of crucial importance for processing, but also the optical transparency. In particular, no depolymerisation methods have been described in the past in particular for hydroxypropyl cellulose that lead, on the one hand, to the required low viscosities and, on the other hand, to highly brilliant solutions or discolouration-free solids.

HPC is an expensive special type and, with global annual production of only approx. 5 kt, is a niche product. Hydroxypropyl cellulose is distinguished from standard ether types, such as methyl hydroxyethyl cellulose ether, carboxymethyl cellulose ether and hydroxyethyl cellulose ether, in the chemical and physical properties thereof, especially in thermoplasticity.

Cellulose ether is made by etherification of cellulose. The cellulose ether obtained is usually washed out with an aqueous medium and finally separated off using methods known to those skilled in the art, for example filtration or centrifugation. The cellulose ether obtained is water-moist. The dry content of the water-moist cellulose ether starting material in step (i) is preferably between 20 and 90 wt. %, more preferably between 20 and 85 wt. %, even more preferably between 35 and 75 wt. %, even more preferably between 40 and 70 wt. %, based on the total mass of the water-moist cellulose ether starting material.

In step (i) according to the invention, the water-moist cellulose ether obtained after the cellulose ether production is preferably used directly as water-moist cellulose ether starting material without further processing, i.e. without drying.

A 2% (dry state) aqueous solution of the cellulose ether starting material preferably has a solution viscosity in the range of 100 to 60,000 mPas, more preferably 100 to 30,000 mPas, even more preferably 150 to 5,000 mPas.

To this end, the viscosity is measured with a Brookfield digital viscometer (LV spindle 2, 60 rpm) at 20° C.

The oxidising agent added in step (ii) can be selected from peroxides or salts thereof, peracids or salts thereof, oxygen ($O_2$) and ozone ($O_3$). The oxidising agent is preferably hydrogen peroxide ($H_2O_2$). The oxidising agent can be added in solution, e.g. in aqueous solution, in solid form, or as a gas. It is preferably used in amounts of 0.01-10 wt. % of the pure oxidising agent (that is, without solvent for example), more preferably 1-6 wt. %, even more preferably 1-4 wt. %, based on the dry mass of the cellulose ether starting material.

The oxidising agent can be added all at once or continuously. One advantage of the method according to the invention is that the oxidising agent can be added to the cellulose ether starting material all at once. This eliminates the need for complex metering steps. The oxidising agent is therefore preferably added all at once, i.e. in one step (single-stage).

In order to achieve optimal homogenisation of the cellulose ether starting material with the oxidising agent, step (ii) is preferably carried out while stirring, kneading or shearing.

Surprisingly, it has been found that advantageous structurally elastic properties can be achieved when using mixing units that allow a high shear energy input into the mixture. Thus, mixing material that is processed with intensive mixers (e.g. from Eirich, Hardheim or Herbst, Buxtehude) experiences a time-dependent thixotropy-like shear thinning that occurs during the shear energy input and also some time (approx. 1-10 minutes) after the shear energy input. This surprising rheological behaviour is particularly advantageous for the subsequent conveying or pumping of the mixing material from the mixing container. This effect is particularly pronounced with hydroxypropyl cellulose (HPC) as the cellulose ether starting material. In one particularly preferred embodiment, step (ii) is therefore particularly preferably carried out using an intensive mixer.

The mixture obtained in step (ii) is then thermally treated at elevated temperatures in the range of 20-100° C., preferably 70-100° C. Usually, the mixture has a temperature of between 15 and 30° C. at the beginning of step (iii), which increases during treatment step (iii) to the required temperature either due to external heating or by shearing. Alternatively, the cellulose ether starting material can already be at the temperature required in step (iii) before an oxidising agent is added in step (ii). Step (iii) can thus take place either at a constant temperature or with a temperature gradient. A temperature gradient is preferably used in step (iii).

Treatment step (iii) preferably takes place over a period of 30-600 minutes, more preferably 60-180 minutes, after the required temperature is reached.

Step (iii) is preferably carried out with shearing to ensure that the mixture is as homogeneous as possible over the entire duration of the treatment step. The shear energy is preferably introduced using the same means as in step (ii). The shear energy input in step (iii) particularly preferably leads to the required temperature being maintained. Step (iii) is preferably carried out under shear with an intensive mixer (see above). In the latter case, due to the rheological behaviour described above, the mixing material can advantageously be removed from the container after treatment step (iii) has ended.

The mixture obtained in step (iii) is dried in a further step. To this end, the mixture obtained in step (iii) is preferably dried at temperatures between 40 and 200° C., more preferably between 60 and 160° C., optionally under reduced pressure (<1 bar, preferably 0-800 mbar).

Step (iv) is preferably completed when the water content of the mixture obtained after step (iv) is ≤10 wt. %, more preferably ≤7 wt. %, even more preferably <5 wt. %, and most preferably ≤4 wt. %, based on the total mass of the mixture.

Step (iv) can also be followed by a comminution step in which the mixture obtained in step (iv) is comminuted using methods known to the person skilled in the art, e.g. grinding or micronising. A powder with a mean particle size distribution of $d_{50}$=250-350 is preferably obtained after the comminution step.

Depolymerisation gives rise to acidic functional groups which are responsible for an acidic pH of an aqueous solution of the mixture obtained. According to step (v), at least one alkaline salt is therefore added to the mixture obtained in step (iv). As a result, the acidic groups in the mixture are at least partially neutralised. The alkaline salt is preferably added as a solid, more preferably as a dry solid, in particular as a powder.

Preferred alkaline salts are selected from sodium hydrogen carbonate, disodium carbonate, sodium dihydrogen phosphate, disodium hydrogen phosphate and trisodium phosphate. The alkaline salt in step (v) is preferably added in an amount of about 0.01 to 3 wt. %, more preferably about 0.1 to 1.5 wt. %, even more preferably about 0.1 to 0.6 wt. %, based on the total weight of the mixture obtained in step (iv). The mixture obtained after step (v) is a low-viscosity cellulose ether product.

In one preferred embodiment, the amount of alkaline salt added is adjusted such that the pH of a 2% aqueous solution of the low-viscosity cellulose ether product is between 5 and 8.

Thus, the cellulose ether product as a 2% aqueous solution preferably has a pH of 5-8.

The low viscosity cellulose ether product as a 2% aqueous solution preferably has a solution viscosity of 1-30 mPas, more preferably 1-20 mPas. The viscosity is measured by means of a Brookfield viscometer, LV spindle 2, 60 rpm at 20° C.

The degree of degradation ($\eta_0/\eta_{new}$) is preferably 10-100, more preferably 10-90.

In one preferred embodiment, no external acid, in particular no external mineral acids and/or organic acid, such as, for example, hydrochloric acid, sulphuric acid, nitric acid, phosphoric acid, trifluoroacetic acid, acetic acid, formic acid, oxalic acid, phthalic acid, maleic acid, or benzoic acid, is added in the method according to the invention. As already explained above, the addition of such acids and subsequent neutralisation with base increase the salt content of the product.

Another aspect of the present invention relates to a low-viscosity cellulose ether product obtainable according to the method described above.

As a 2% aqueous solution, the low-viscosity cellulose ether product preferably has a solution viscosity of 1-30 mPas, measured using a Brookfield viscometer, LV spindle 2, 60 rpm at 20° C. The person skilled in the art distinguishes between low-viscosity types that have a viscosity of <50 mPas and very low-viscosity types having a viscosity of <20 mPas.

The low-viscosity cellulose ether product has a solution viscosity of 0.03-10%, preferably 0.1-8%, of the solution viscosity of the cellulose ether starting material, the solution viscosities each being measured using a Brookfield viscometer, LV spindle 2, 60 rpm at 20° C.

The low-viscosity cellulose ether product as a 2% aqueous solution preferably has a pH of 5-8.

As a 2% aqueous solution, the cellulose ether product preferably has a yellow discolouration index of <10, measured according to ASTM-E313 with illuminant C, viewing angle 2°. The yellow discolouration index of the cellulose ether product as a ground solid is preferably <20.

The sulphate ash concentration of the low-viscosity cellulose ether product is preferably <1%, preferably <0.5%, according to Ph.Eur. [9004-64-2].

The chloride content of the low-viscosity cellulose ether product is preferably <0.5%, more preferably <0.3%, measured according to Ph.Eur. [9004-64-2].

In one preferred embodiment, the low-viscosity cellulose ether product according to the invention is used as a tabletting aid, for example as a coating material, binder, or capsule-forming material, for paints, or as a gelling agent for food additives, organic solvents, or ceramic compositions.

In one particularly preferred embodiment, the low-viscosity cellulose ether product according to the invention is used as a tabletting aid.

The following examples are intended to illustrate the present invention.

EXAMPLE 5 kg warm, plasticine-like moist product HPC (temp.: approx. 50° C.; water content: 45%; determined from dry product: HPO: 73.7%, viscosity 2% in water: 353 mPas (Brookfield LV, spindle 2, 60 rpm, 20° C.) is provided in one step, with the entire amount of hydrogen peroxide solution (150 mL, 47%), in an intensive mixer from Herbst, Buxtehude. The mixture is heated to 80° C. using a heatable intensive mixer and mixed intensively for 90 minutes (stirrer speed: 40 rpm, dissolver speed: 400 rpm). The system is covered, but not completely closed, in order not to build up pressure in the event of gas evolution, but to prevent the evaporation of water or oxidising agent to a large extent.

After the degradation time has elapsed, the stirring elements are stopped, the container is opened, and the free-flowing product is drained. After drying and grinding, a colourless powder is obtained which develops a pH of 3.5 as a 2% aqueous solution. 0.3 wt. % solid sodium hydrogen carbonate is added to the dried, ground degradation product and mixed well (HPC P10). The 2% aqueous solution then produced therefrom has a viscosity of 10 mPas in a rotary viscometer LV (spindle 2, 60 rpm, 20° C.) and is a highly clear liquid with a yellow index of 3.3 (ASTM E313).

If the degradation time is extended from approx. 90 minutes to 100 (HPC P10F; 0.35% NaHCO$_3$) or 120 minutes (HPC P6), similarly soluble clear products can be produced in the otherwise unchanged process as described above.

The data are summarised in the table below.

| Product | Viscosity [mPa s] | HPO [%] | White-ness * Powder | YI Powder | YI Solution | pH [2%] |
|---|---|---|---|---|---|---|
| HPC P10 | 10.3 | 73.9 | 82.0 | 5.34 | 3.3 | 5.9 |
| HPC P10F | 9.4 | 71.8 | 92.0 | 3.08 | 4.3 | 7.0 |
| HPC P6 | 8.6 | 72.1 | 80.0 | 7.74 | 4.0 | 5.7 |

* Measured according to DIN 5033

The invention claimed is:

1. A method for producing a low-viscosity cellulose ether product, the method comprising the steps:
    (i) providing at least one water-moist cellulose ether starting material, wherein the dry content of the water-moist cellulose ether starting material is from 20-85 wt.

%, based on the total mass thereof, and the water content of the water-moist cellulose ether starting material is from 15-80 wt. %, based on the total mass thereof;

(ii) adding at least one oxidising agent to the cellulose ether starting material from step (i) under shear;

(iii) treating the mixture obtained in step (ii) at temperatures in the range of 20-100° C.;

(iv) drying the mixture obtained in step (iii), wherein the water content of the mixture obtained after said drying step (iv) is 10 wt. %, based on the total mass of the mixture; and (v) adding at least one alkaline salt to the mixture obtained in step (iv) to obtain the low-viscosity cellulose ether product, the cellulose ether starting material having a higher solution viscosity than the cellulose ether product.

2. The method according to claim 1, wherein the cellulose ether starting material is selected from hydroxypropyl cellulose (HPC), methyl hydroxypropyl cellulose (MHPC) or methyl hydroxyethyl cellulose (MHEC).

3. The method according to claim 1, wherein the dry content of the water-moist cellulose ether starting material from step (i) is 35-75 wt. %, based on the total mass thereof.

4. The method according to claim 1, wherein the solution viscosity of the cellulose ether starting material from step (i) as a 2% aqueous solution is in the range of 100-60,000 mPas.

5. The method according to claim 1, wherein the oxidising agent is selected from peroxides and salts thereof, peracids and salts thereof, or 02 and 03.

6. The method according to claim 1, wherein the oxidising agent is added in solution, in solid form or as a gas.

7. The method according to claim 1, wherein the oxidising agent is added in amounts of 0.01 to 10 wt. %, based on the dry mass of the cellulose ether starting material.

8. The method according to claim 1, wherein step (iii) takes place over a period of 30-600 minutes.

9. The method according to claim 1, wherein step (iii) takes place under shear.

10. The method according to claim 1, wherein step (iv) takes place at temperatures between 40 and 200° C., optionally under reduced pressure (<1 bar).

11. The method according to claim 1, wherein the water content of the mixture obtained after step (iv) is <7 wt. %, based on the total mass of the mixture.

12. The method according to claim 1, wherein a comminution step takes place after the drying according to step (iv).

13. The method according to claim 1, wherein the alkaline salt in step (v) is added as a solid.

14. The method according to claim 1, wherein the alkaline salt is selected from the group consisting of sodium hydrogen carbonate, disodium carbonate, sodium dihydrogen phosphate, disodium hydrogen phosphate, and trisodium phosphate.

15. The method according to claim 1, wherein the alkaline salt in step (v) is added in an amount of about 0.01-3 wt. % based on the total weight of the mixture obtained in step (iv).

16. The method according to claim 1, wherein the amount of alkaline salt is adjusted so that the pH of a 2% aqueous solution of the low-viscosity cellulose ether product is between 5 and 8.

17. The method according to claim 1, wherein the low-viscosity cellulose ether product obtained after step (v) as a 2% aqueous solution has a solution viscosity of 1-30 mPas.

18. The method according to claim 1, wherein the cellulose ether starting material is hydroxypropyl cellulose (HPC).

19. The method of claim 1, wherein the low-viscosity cellulose ether product has a yellowing index of <10 as measured by ASTME313.

* * * * *